US012673618B2

(12) United States Patent
Larson

(10) Patent No.: US 12,673,618 B2
(45) Date of Patent: Jul. 7, 2026

(54) FIREARM HOLDER FOR VEHICLES

(71) Applicant: Hunter Larson, St George, UT (US)

(72) Inventor: Hunter Larson, St George, UT (US)

( * ) Notice: Subject to any disclaimer, the term of this patent is extended or adjusted under 35 U.S.C. 154(b) by 88 days.

(21) Appl. No.: 18/536,604

(22) Filed: Dec. 12, 2023

(65) Prior Publication Data

US 2024/0140320 A1 May 2, 2024

Related U.S. Application Data

(63) Continuation-in-part of application No. 18/064,602, filed on Dec. 12, 2022, now abandoned.

(60) Provisional application No. 63/288,270, filed on Dec. 10, 2021.

(51) Int. Cl.
    *B60R 7/14* (2006.01)
(52) U.S. Cl.
    CPC .................................... *B60R 7/14* (2013.01)
(58) Field of Classification Search
    CPC ... B60R 7/14; B60R 7/04; B60R 7/043; Y10S 224/913; F41A 23/18; F41C 33/06; A47B 81/005
    See application file for complete search history.

(56) References Cited

U.S. PATENT DOCUMENTS

| | | | | |
|---|---|---|---|---|
| 2,692,069 A | * | 10/1954 | Winters | A47B 81/005 |
| | | | | 211/64 |
| 4,852,780 A | * | 8/1989 | Woodbury | B60R 7/14 |
| | | | | 224/571 |
| 5,443,191 A | * | 8/1995 | Jorgenson | B60R 7/14 |
| | | | | 224/543 |
| 6,443,346 B1 | * | 9/2002 | Haass | B60R 7/14 |
| | | | | 224/558 |
| 6,766,927 B1 | * | 7/2004 | Cart | B60R 7/14 |
| | | | | 224/571 |
| 10,190,339 B1 | * | 1/2019 | Mack | E05B 73/0005 |
| 11,732,992 B1 | * | 8/2023 | Ellinghuysen | F41B 5/1453 |
| | | | | 42/94 |
| 2009/0026679 A1 | * | 1/2009 | Harman, III | F41C 27/00 |
| | | | | 269/74 |
| 2013/0088792 A1 | * | 4/2013 | Jones | B60R 1/04 |
| | | | | 359/872 |
| 2017/0267188 A1 | * | 9/2017 | Wilkinson | B60R 11/02 |
| 2018/0170268 A1 | * | 6/2018 | Fisher | B60R 7/14 |

* cited by examiner

*Primary Examiner* — Adam J Waggenspack
(74) *Attorney, Agent, or Firm* — Gurr & Brande, PLLC; Robert A. Gurr

(57) ABSTRACT

A firearm holder features a leg having a non-abrasive coating coupled to a U-shaped bracket, wherein the leg is interposable between the seats of a vehicle and the bracket is configured to receive the stock of a firearm. In some examples, the bracket includes an adjustable arm opposite a fixed arm configured to vary the width of the bracket to accommodate a variety of models and sizes of stocks. The firearm holder may also feature a strap used to secure the firearm within the bracket, a cable lock configured to immobilize the trigger or receiver of the firearm, and a base member configured to stabilize the firearm holder.

9 Claims, 18 Drawing Sheets

FIREARM HOLDER FOR VEHICLES

CROSS-REFERENCE TO RELATED APPLICATIONS

This application is continuation-in-part of U.S. Nonprovisional application Ser. No. 18/064,602, filed on Dec. 12, 2022 which claimed the benefit of U.S. Provisional Application Ser. No. 63/288,270, filed on Dec. 10, 2021, all of which are incorporated herein by reference.

TECHNICAL FIELD

The present disclosure relates to transporting firearms. More particularly, the present disclosure relates to an apparatus for securing a firearm, such as a rifle or shotgun, in a vehicle during transport.

BACKGROUND

Firearms such as rifles and shotguns are regularly transported in the cab of a truck or passenger area of a car. To aid with safety, firearms should be secured during transport. The most common method to secure a shotgun or rifle in a vehicle is with a gun rack. These racks are typically mounted in a back window or on the back of a seat. While these methods are safe and convenient for transport, they impede quick access to the firearm. For example, there are many circumstances where quick access to a firearm is desirable, such as hunting or law enforcement. However, on many occasions, a user must exit the vehicle to properly access the stowed firearm.

In addition, these racks often require physical modifications to the vehicle, such as the addition of screws that are drilled into the vehicle, creating permanent damage. Other racks obstruct the back seat and prevent the seat from changing position (e.g., sliding forward or backward or altering the angle) or interfere with passengers in the back seat.

Accordingly, there is a need for a firearm holder that does not require modification to the vehicle, permits a user to adjust the seat, enables quick access to the firearm, and that conforms to the stock of a wide variety of rifles and shotguns. The present disclosure solves these problems and others.

SUMMARY OF EXAMPLE EMBODIMENTS

In some embodiments, a firearm holder comprises a leg and a bracket, the leg interposable between seats and the bracket configured to receive the stock of a firearm. The bracket may be U-shaped and sized so as to receive any one of a variety of stocks. In some embodiments, the bracket comprises an adjustable arm so as to vary the width to fit a variety of stocks. In some embodiments, a strap or band may further be used to secure the firearm in the bracket.

In some methods of use, a user inserts the leg between two seats or between a seat and a console, with the bracket at the top thereof remaining exposed. A user may then place a firearm stock within the bracket, with the barrel resting on the seat and/or the floor. The user may also position the barrel of the firearm within a floor barrel bracket. As a result, the firearm is cradled and prevented from sliding around while remaining accessible to the driver and/or passenger.

DETAILED DESCRIPTION OF EXAMPLE EMBODIMENTS

Figure 1:
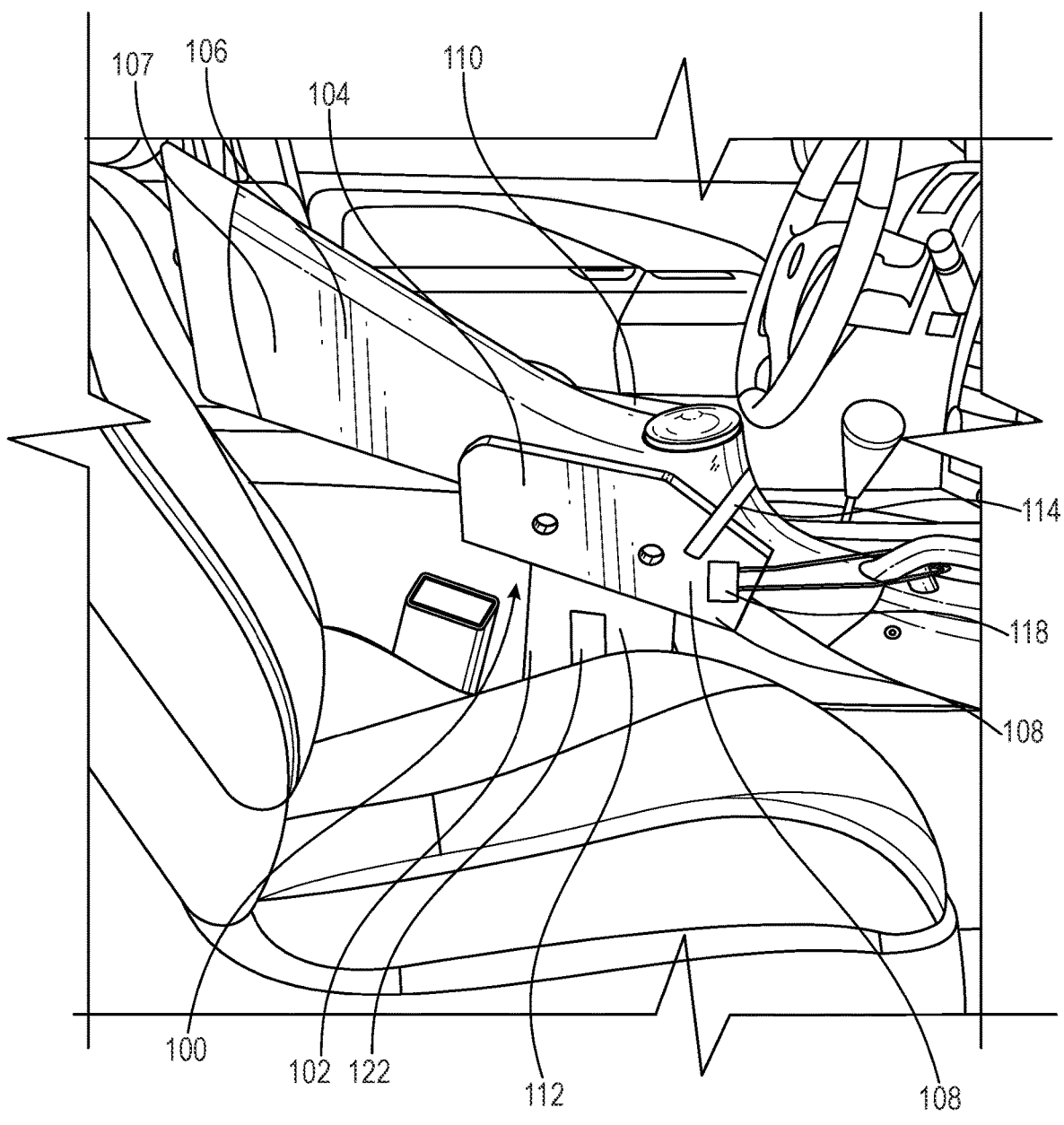
FIG. 1 illustrates a side perspective view of a firearm holder positioned between seats and securing a firearm.
Figure 2:
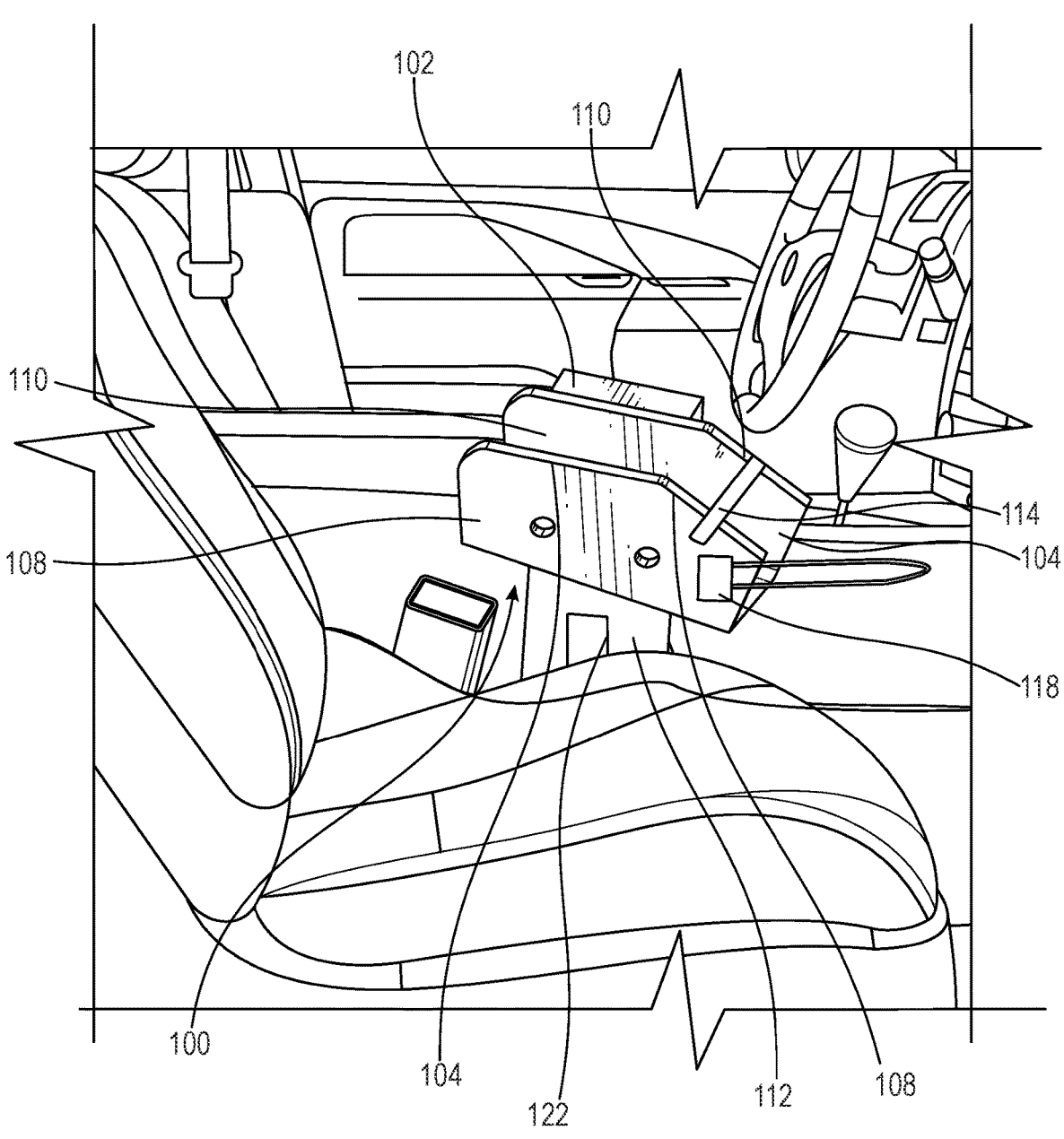
FIG. 2 illustrates a top perspective view of a firearm holder positioned between seats.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As discussed earlier, there is a need for a firearm holder that may be installed without permanent modification to the vehicle, that allows a user to adjust his or her seat, that enables ready access to the firearm, and that accommodates a variety of rifles and shotguns. The firearm holder disclosed herein seeks to solve these and other problems.

Figure 3:
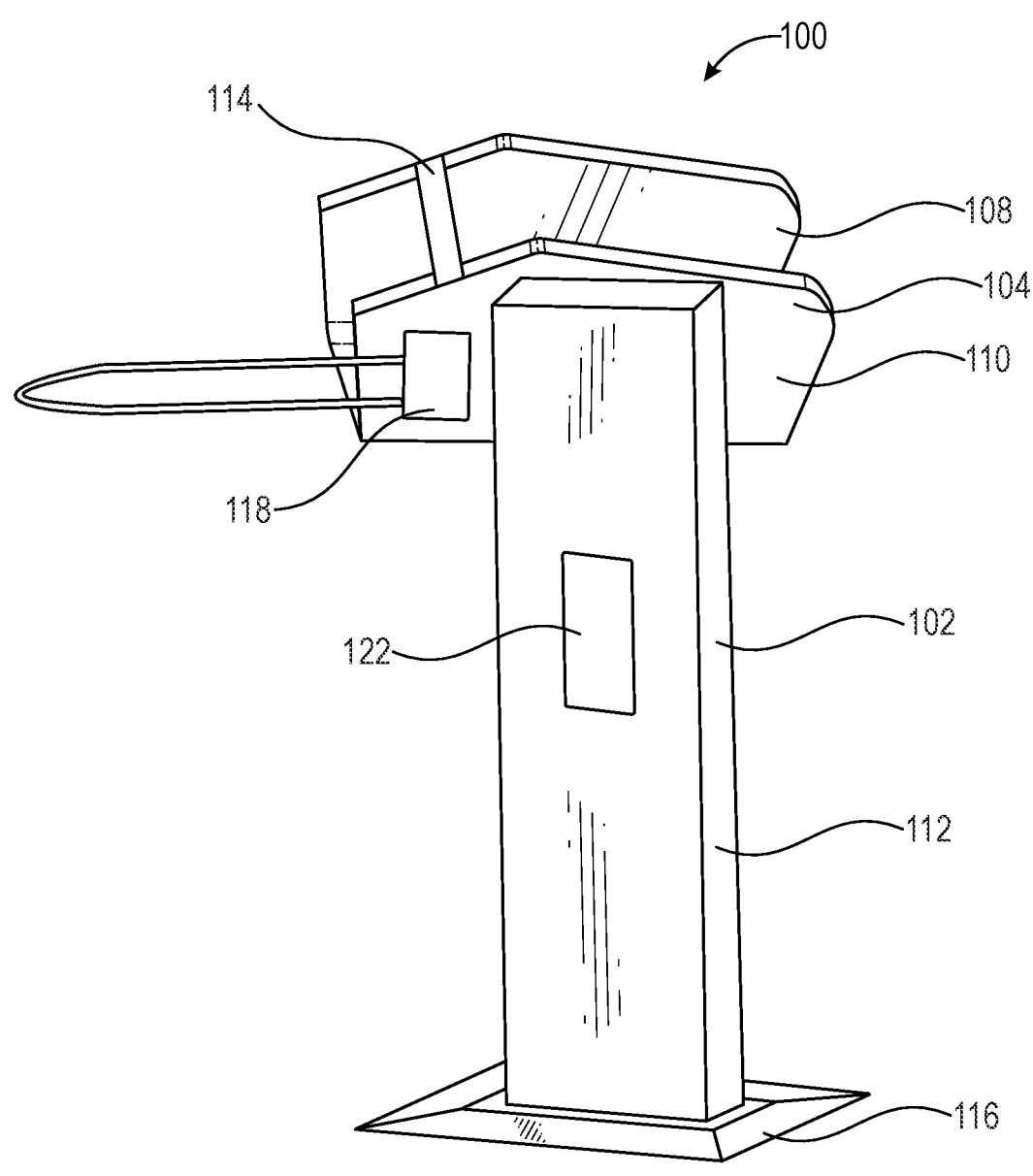
FIG. 3 illustrates a left side perspective view of a firearm holder.
Figure 4:
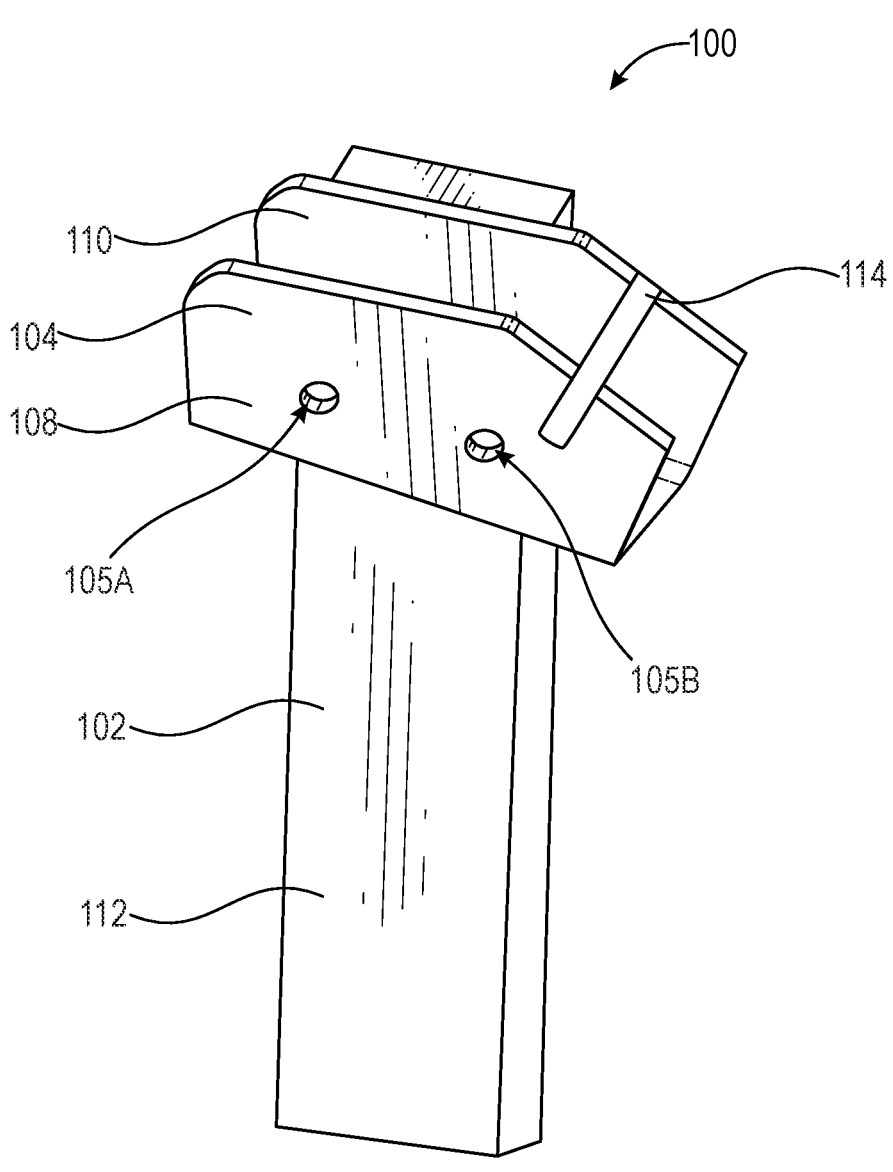
FIG. 4 illustrates a right side perspective view of a firearm holder.
Figure 5:
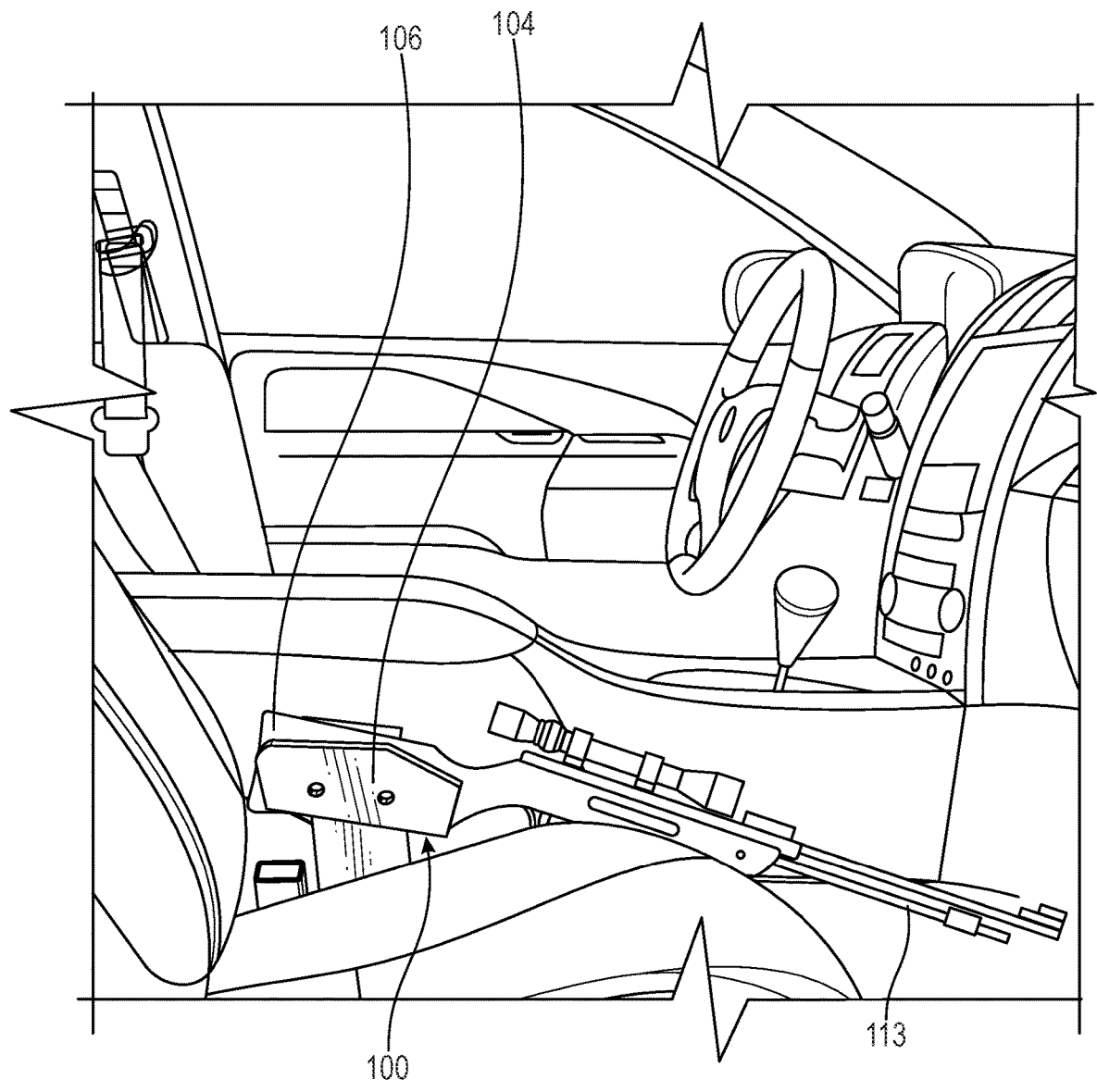
FIG. 5 illustrates a side perspective view of a firearm holder positioned between a seat and a console, securing a firearm.

Referring to FIGS. 1-4, in some embodiments, a firearm holder 100 comprises a leg 102 and a bracket 104, the leg 102 being interposable between two vehicle seats and the bracket 104 configured to receive the stock 106 of a firearm 107 (e.g., rifle, shotgun, etc.). The bracket 104 may be U-shaped and sized so as to receive any one of a variety of stocks 106 with varying widths. In some embodiments, the bracket 104 comprises a first adjustable arm 108 opposite a second fixed arm 110 so as to vary the width of the bracket 104 to accommodate a variety of makes and models of firearms having stocks 106 with differing shapes and sizes. Any known clamping methods may be used to effectuate the clamping of the first and second arms 108, 110 on the stock 106, such as threaded bolts, rods and springs, etc. In other embodiments, spring-loaded protrusions or bushings may be used inside the bracket 104 so as to dynamically adjust to stocks 106 of different widths. In some embodiments, as best seen in FIG. 4, one or more apertures 105A, 105B allow for thumb screws or other mechanisms to pass through to place pressure on the stock of a gun, thereby clamping the stock in place within the bracket 104. While not required, this may help avoid unwanted movement of the gun during transport while also accommodating variously-sized stocks.

In some embodiments, a strap 114 or band may further be used to secure the firearm 107 within the bracket 104. For example, the strap 114 may be coupled to the fixed arm 110, pass over the stock 106, and then be coupled to the adjustable arm 108. The strap 114 may comprise a button and clasp, hook and loop closure, magnets, or other know fastening mechanisms. In some embodiments, the firearm holder 100 may comprise a cable lock 118. The cable lock 118 may be positioned through the receiver of the firearm or through the trigger guard providing an added safety measure around younger passengers or to aid in theft deterrent, and may also act as a safeguard against accidental discharge by immobilizing the receiver or trigger.

In some embodiments, as seen in FIG. 3, the leg 102 may further comprise a base member 116. The base member 116 may comprise one or more feet, or a lip that circumscribes the leg 102 and radiates outwards to provide additional stability and grounding to the floor of the vehicle. In some embodiments, the base member 116 may comprise screw or bolt apertures, allowing the base member 116 to be securely fastened to the body of the vehicle. This ensures that the firearm holder 100 does not move during transport or use. Additionally, if used in combination with a cable lock 118, the firearm holder 100 deters theft of any firearm in the firearm holder 100.

It will be appreciated that the leg 102 and bracket 104 may be made from a variety of materials, including woods, plastics, metals, carbon fibers, any other suitable material, or combinations thereof. Referring to FIGS. 8-12, the leg 102 may comprise a soft, non-abrasive coating 112 configured to prevent aesthetic damages from scrapes or scratches when inserting the leg 102 between seats and or the console. The non-abrasive coating 112 may be a spray-on finish comprising silicones, epoxies, polyurethanes or the like. Alternatively, the non-abrasive coating 112 may comprise a material or fabric such as felt, bamboo fiber, cotton, rayon, polyester, wool, similar materials, or combinations thereof. It will be appreciated that the non-abrasive coating 112 will protect leather interiors and vehicle fixtures such as seat belt bases from aesthetic damage when inserting the leg 102 into position within the vehicle.

Figure 6:
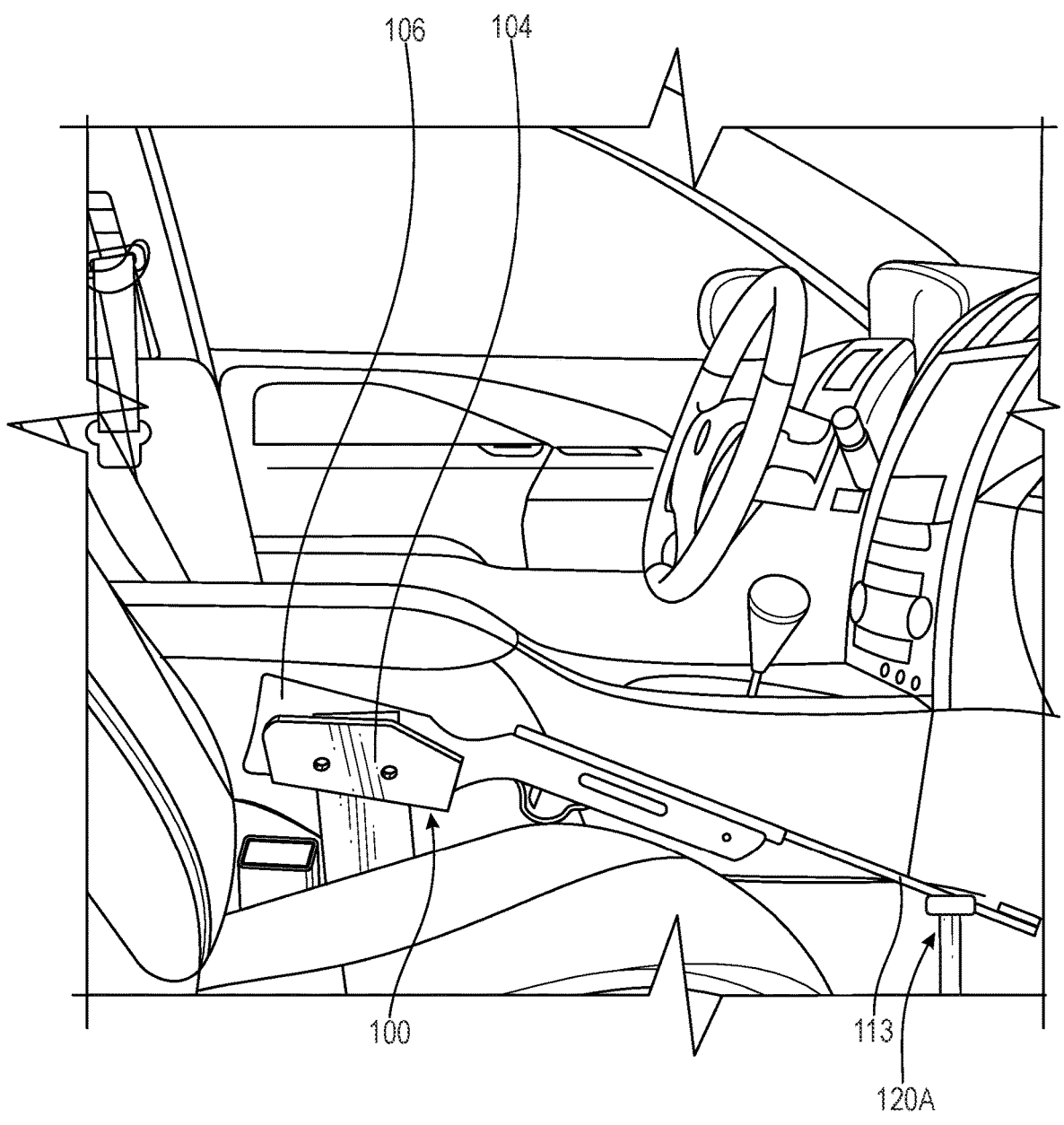
FIG. 6 illustrates a side perspective view of a firearm holder positioned between a seat and a console, securing a firearm.

Additionally, the leg 102 may be of sufficient length so as to be interposed between two seats without dislodging therefrom unless a user applies a pulling force. In some embodiments, the leg 102 is long enough to pass between the seats and contact the floor while leaving the bracket 104 exposed (i.e., not below the surface of the seats). In some embodiments, as shown in FIG. 6, a firearm holder 100 further comprises a floor barrel bracket 120A for supporting the barrel 113. In some embodiments, the floor barrel bracket 120A may be couplable to the muzzle to obstruct and secure the opening. The floor barrel bracket 120A may be weighted and comprise a textured base configured to grip the floor of the vehicle without sliding or moving around while the vehicle is in motion. An adhesive, hook and loop fastener, bolts, or other means may be employed to more securely mount the floor barrel bracket 120A to the floor of the vehicle. The barrel bracket 120A may comprise a barrel cradle 121 and a leg 123 for resting on the floor of the vehicle. The barrel cradle 121 may be U-shaped, semi-circular to complement the barrel, or any other suitable shape for supporting the barrel.

Figure 7:
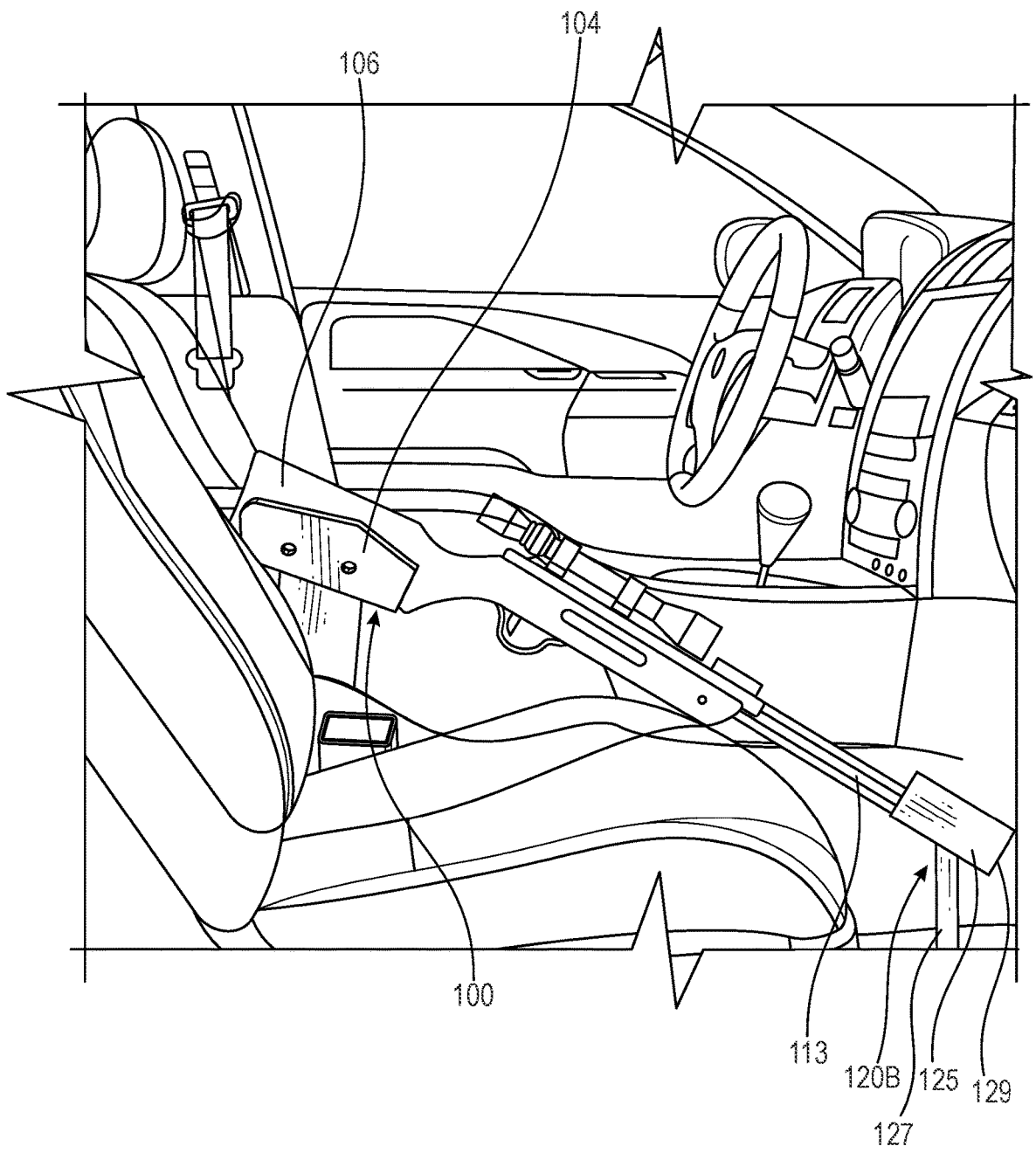
FIG. 7 illustrates a side perspective view of a firearm holder positioned between a seat and a console, securing a firearm.
Figure 8:
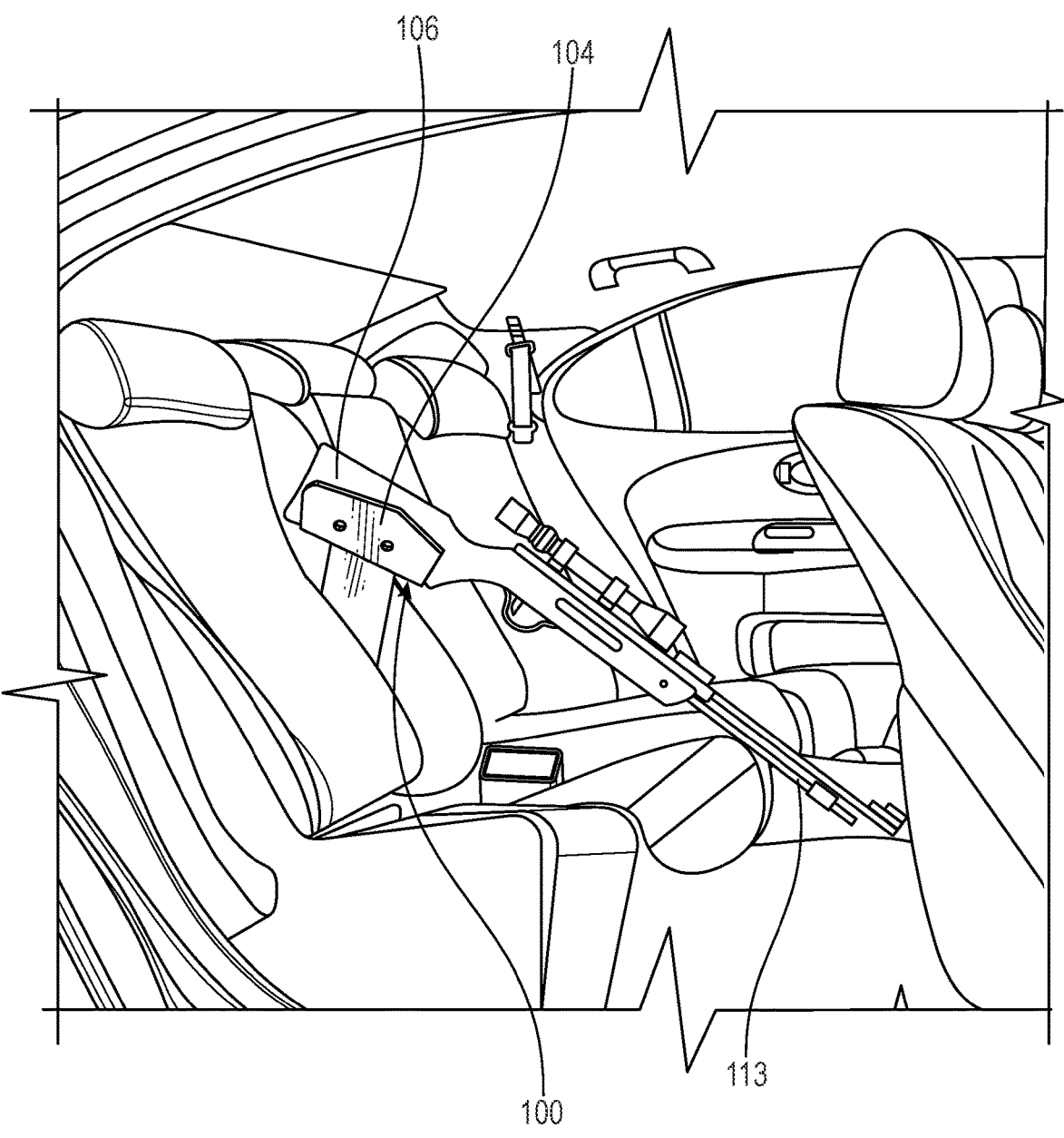
FIG. 8 illustrates a side perspective view of a firearm holder positioned between rear seats and securing a firearm with a scope.

Referring to FIG. 7, in some embodiments, a floor barrel bracket 120B comprises a barrel sleeve 125 for receiving the barrel 113. The barrel sleeve 125 may be cylindrical to complement the shape of a barrel 113. The barrel sleeve 125 may be made from any suitable material, such as aluminum, plastic, etc. In some embodiments, the barrel sleeve 125 may be interchangeable on a base 127 to accommodate different sizes of barrels 113. This allows a base 127 to remain secured to the floor (e.g., bolted, magnetized, etc.) of a vehicle while easily swapping the barrel sleeve 125 to accommodate a user-selected firearm. Additionally, the barrel sleeve 125 may be closed at the base end 129 to keep the muzzle free of debris while ensuring it is secured. The interior of the sleeve may comprise felt or other non-abrasive surfaces so as to not scratch or otherwise damage the barrel 113.

In some embodiments, a magnet 122 (best seen in FIGS. 1-3) may be coupled firstly to the leg 102 of the firearm holder 100 and secondly to a side of the seat or console, thereby further securing the firearm holder 100 in place. As a result, it will be appreciated that there are several embodiments where no vehicle modifications are needed to use the firearm holder 100. Additionally, the seat positioning may be adjusted forwards and backwards, the seatbelt clipped in and out, or the console opened and closed, without disturbing the firearm 107. As a result, the firearm holder 100 overcomes the problems in the prior art.

Figure 9:
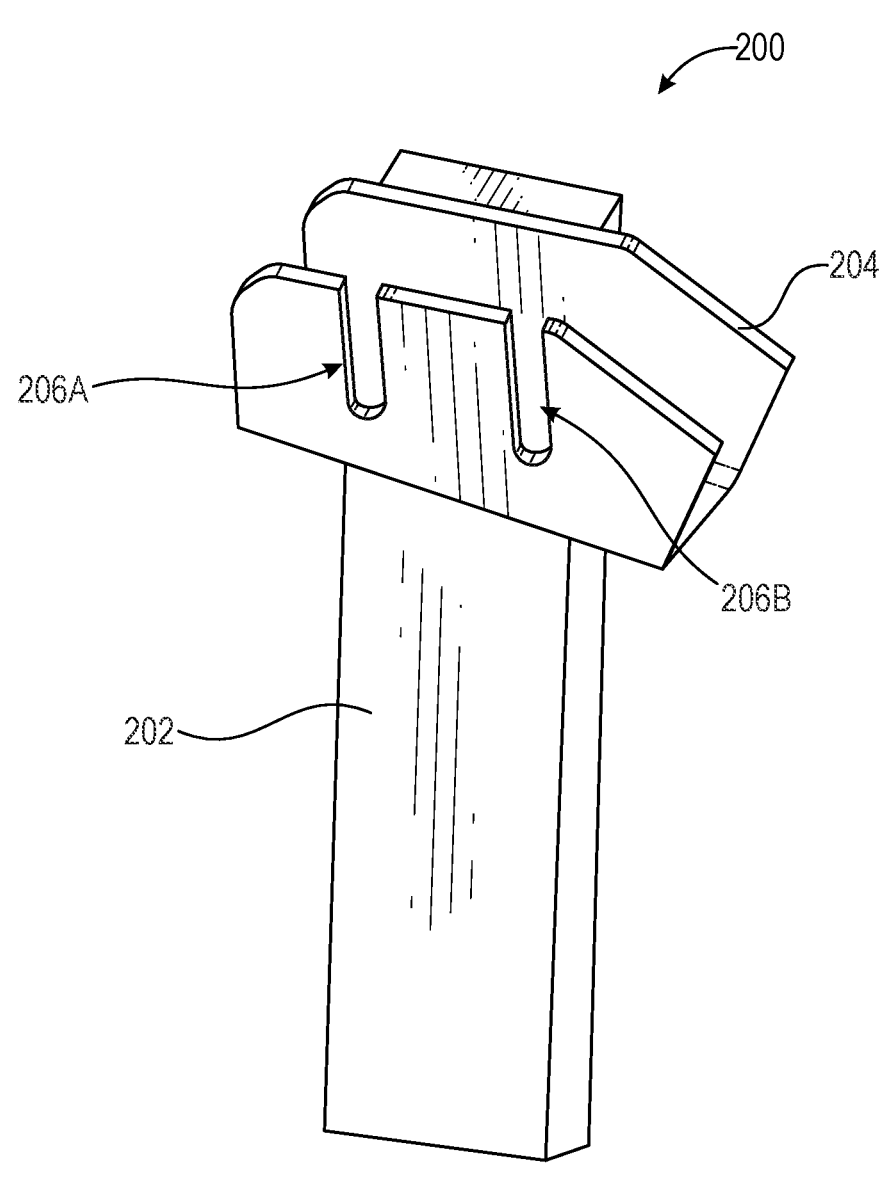
FIG. 9 illustrates a right side perspective view of a firearm holder.
Figure 10:
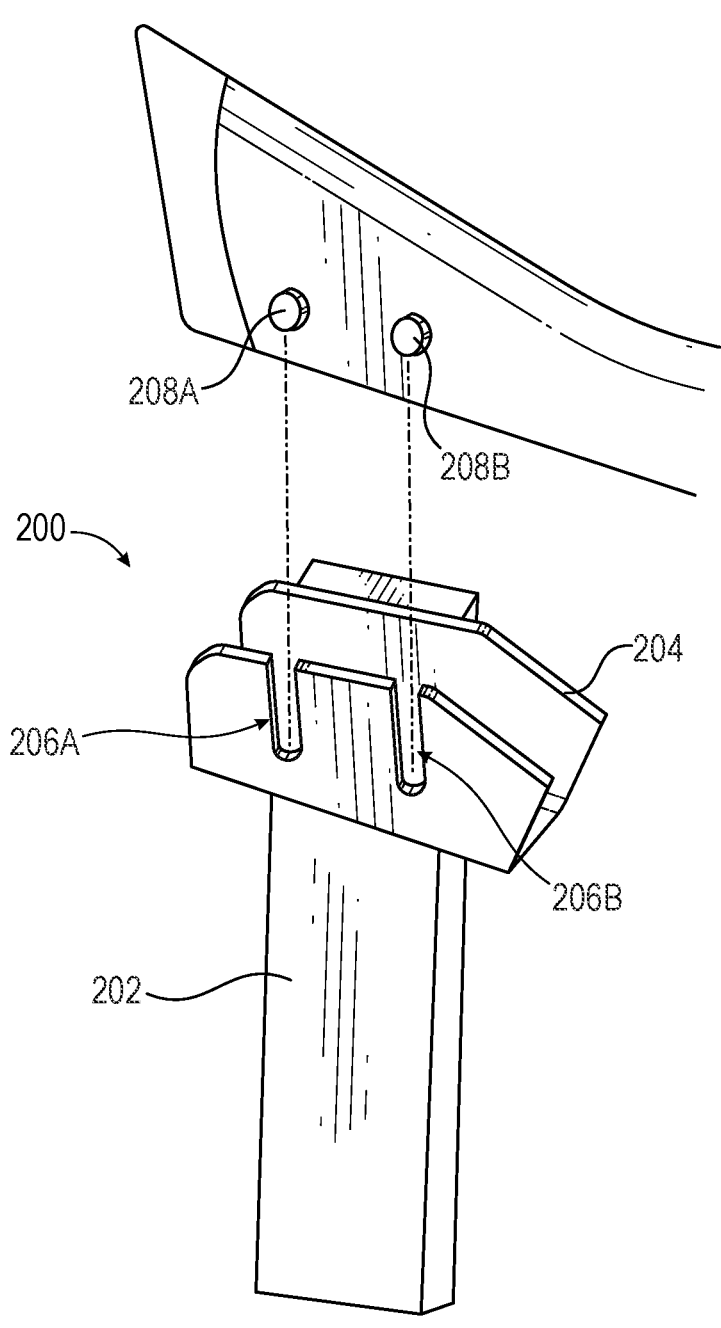
FIG. 10 illustrates a right side perspective view of a firearm holder.

In some embodiments, as shown in FIG. 9, a firearm holder 200 comprises a leg 202 and a bracket 204, wherein the bracket comprises one or more channels 206A, 206B for receiving one or more stock protrusions 208A, 208B, respectively. The stock protrusions 208A, 20B may be retrofitted to any stock by screwing into the stock, by using adhesives, or by using straps. This aids in preventing the firearm from moving during transport. It will be appreciated that straps and other mechanisms may also be used to better secure the firearm, although no additional securing mechanisms are required.

Figure 14:
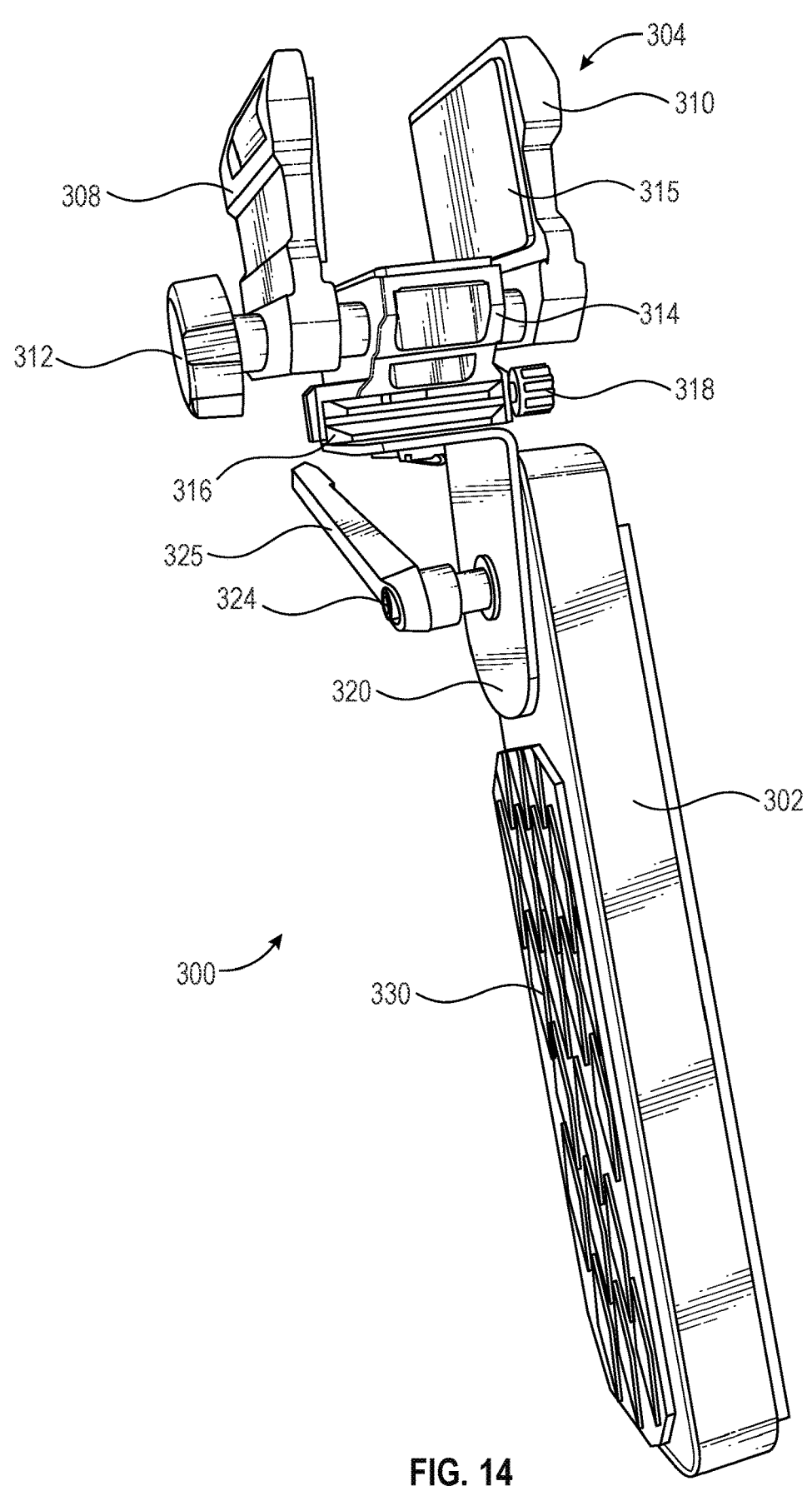
FIG. 14 illustrates a front perspective view of a firearm holder.

In some methods of use, a user would wedge the leg 102 between two seats, a seat and a center console, or a seat and a door, with the bracket 104 at the top thereof remaining exposed. Because the leg 102 is wedged, it is held in place without modifications to the vehicle. As shown in FIGS. 5-8, a user may then place a firearm stock 106 in the bracket 104, with a barrel resting on the seat and/or the floor, or remaining elevated therefrom. In some embodiments, the adjustable arm 108 may slide or move opposite the fixed arm 110 to accommodate the size of the firearm stock 106. As a result, the firearm 107 is cradled and prevented from sliding around while remaining readily accessible to the driver and/or passenger. A user may fasten the strap 114 across the stock 106 of the firearm 107 or couple the cable lock 118 around the receiver or trigger guard of the firearm 107. In some embodiments, a magnet 122 may be coupled to a metal component of the vehicle to further stabilize the firearm holder 100 during use. In some embodiments, as best seen in FIG. 14, or other mechanisms to pass through to place pressure on the stock of a gun, thereby clamping the stock in place within the bracket 104.

Figure 11:
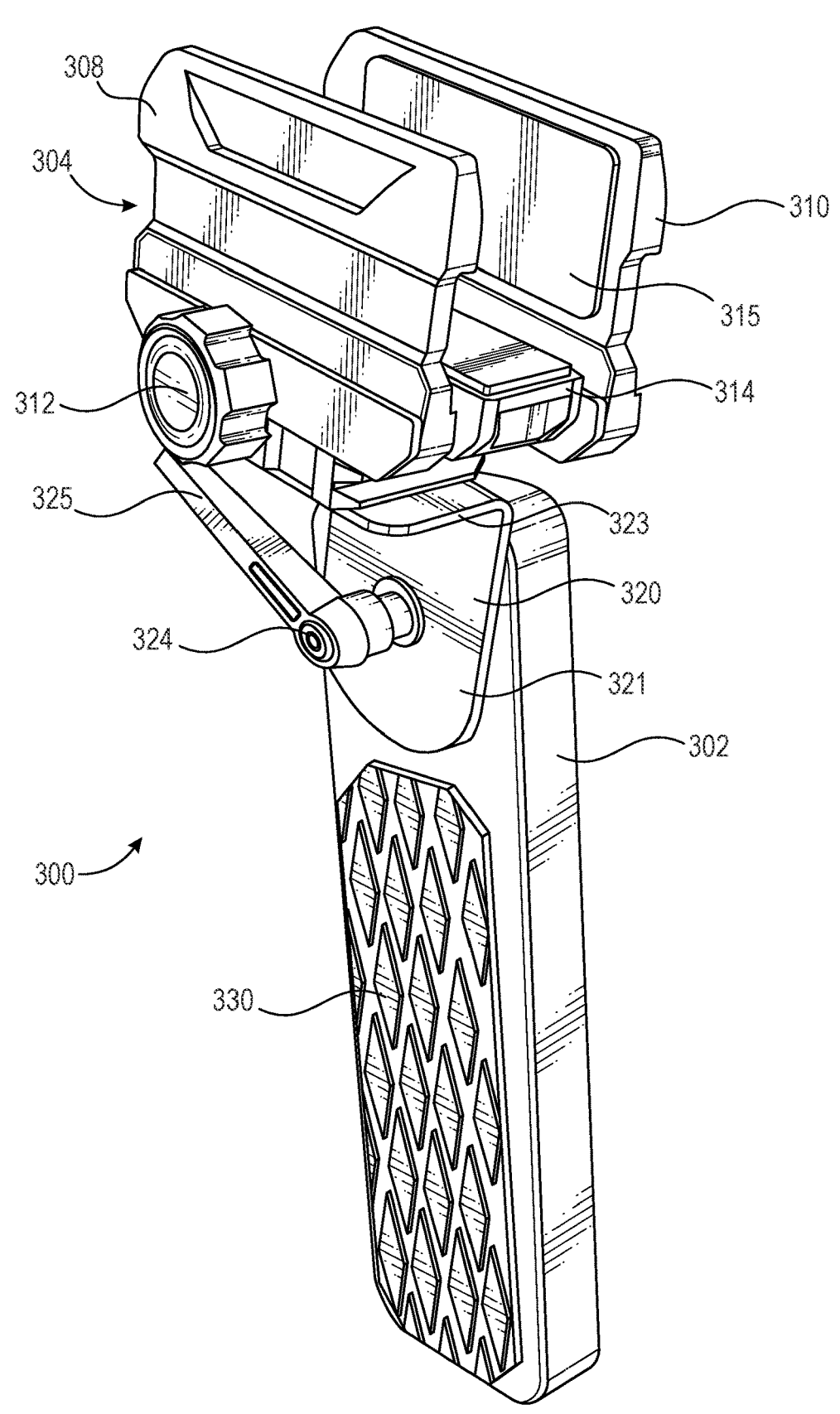
FIG. 11 illustrates front, right side perspective view of a firearm holder.
Figure 12:
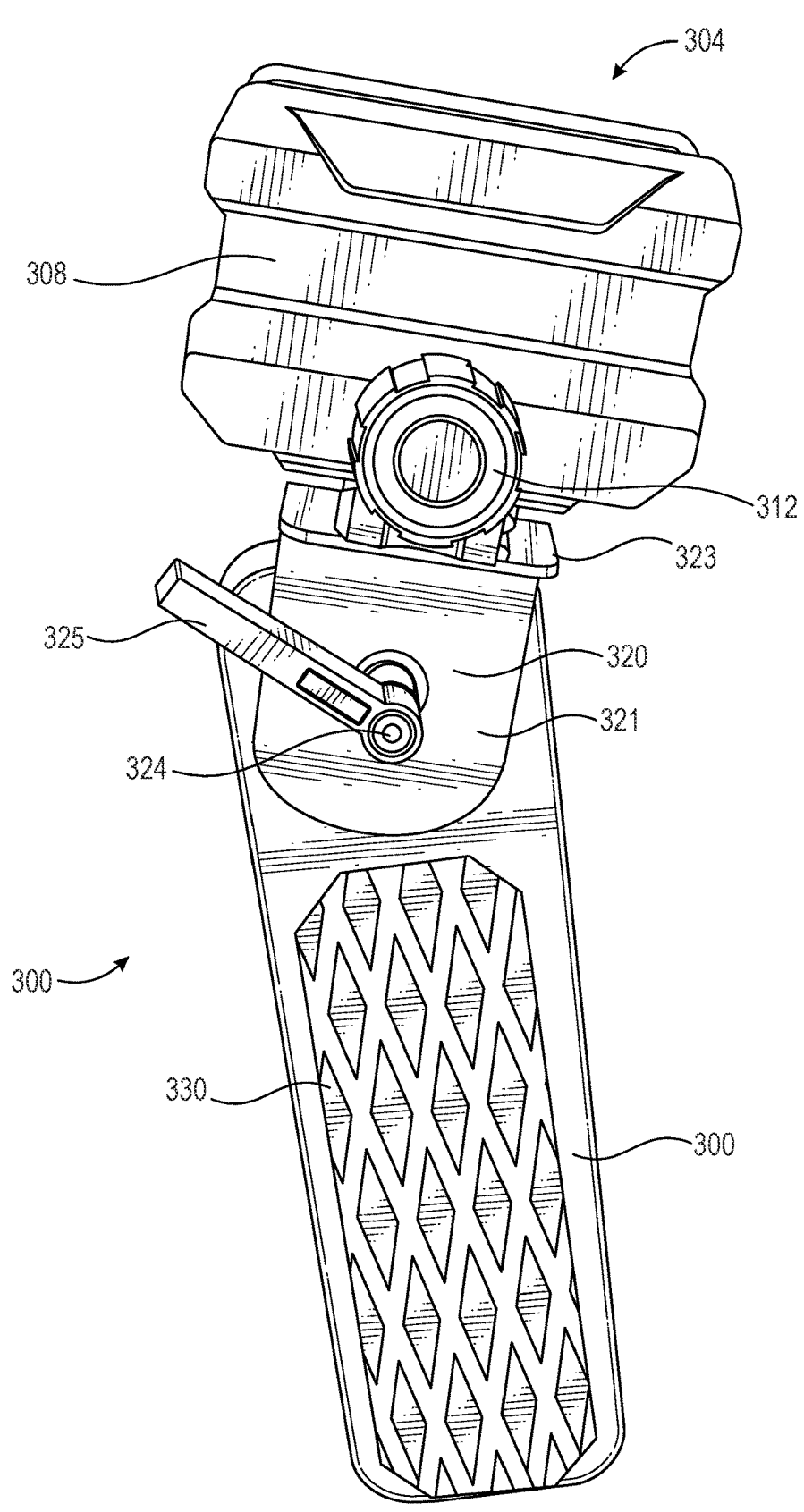
FIG. 12 illustrates a right side elevation view of a firearm holder.
Figure 13:
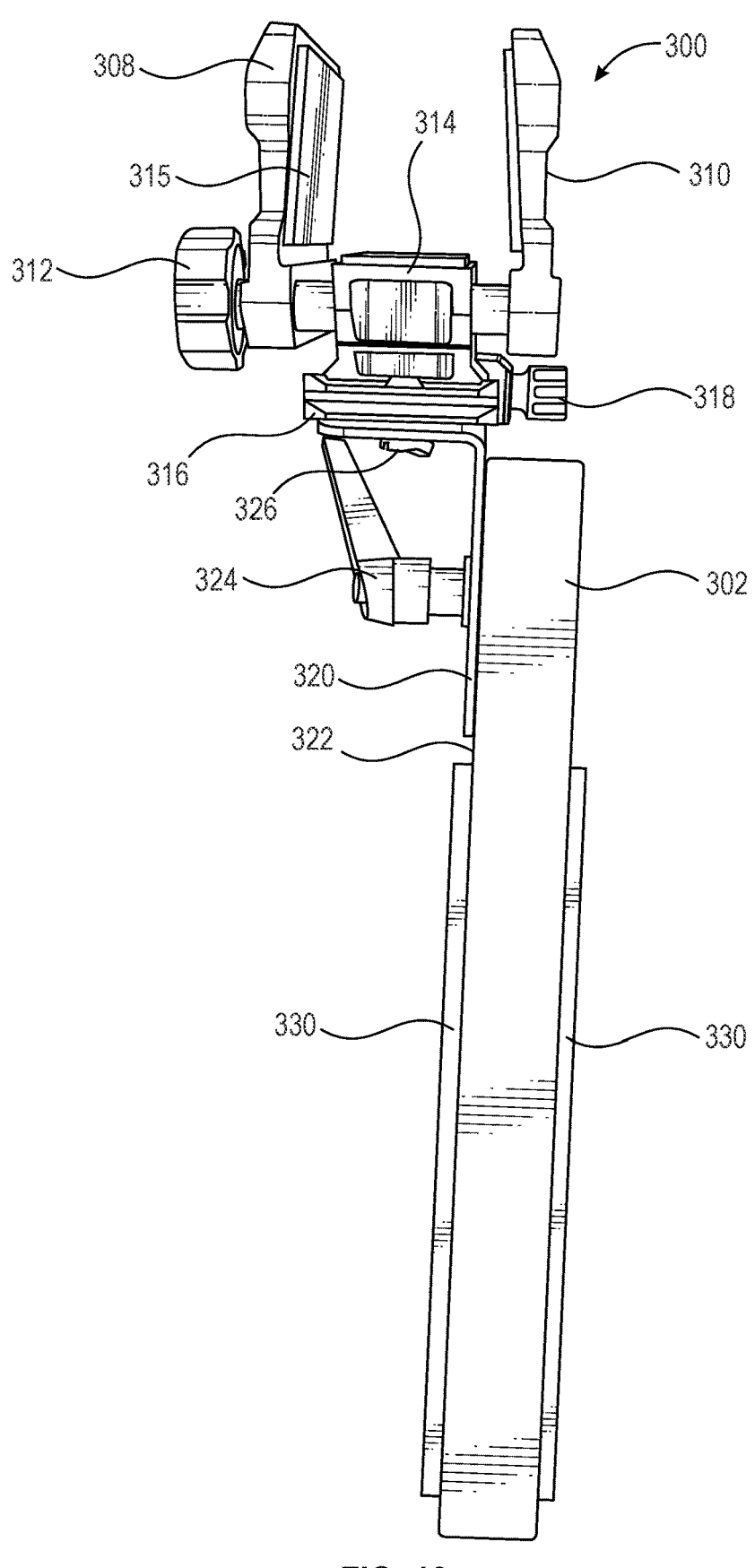
FIG. 13 illustrates a front elevation view of a firearm holder.
Figure 15:
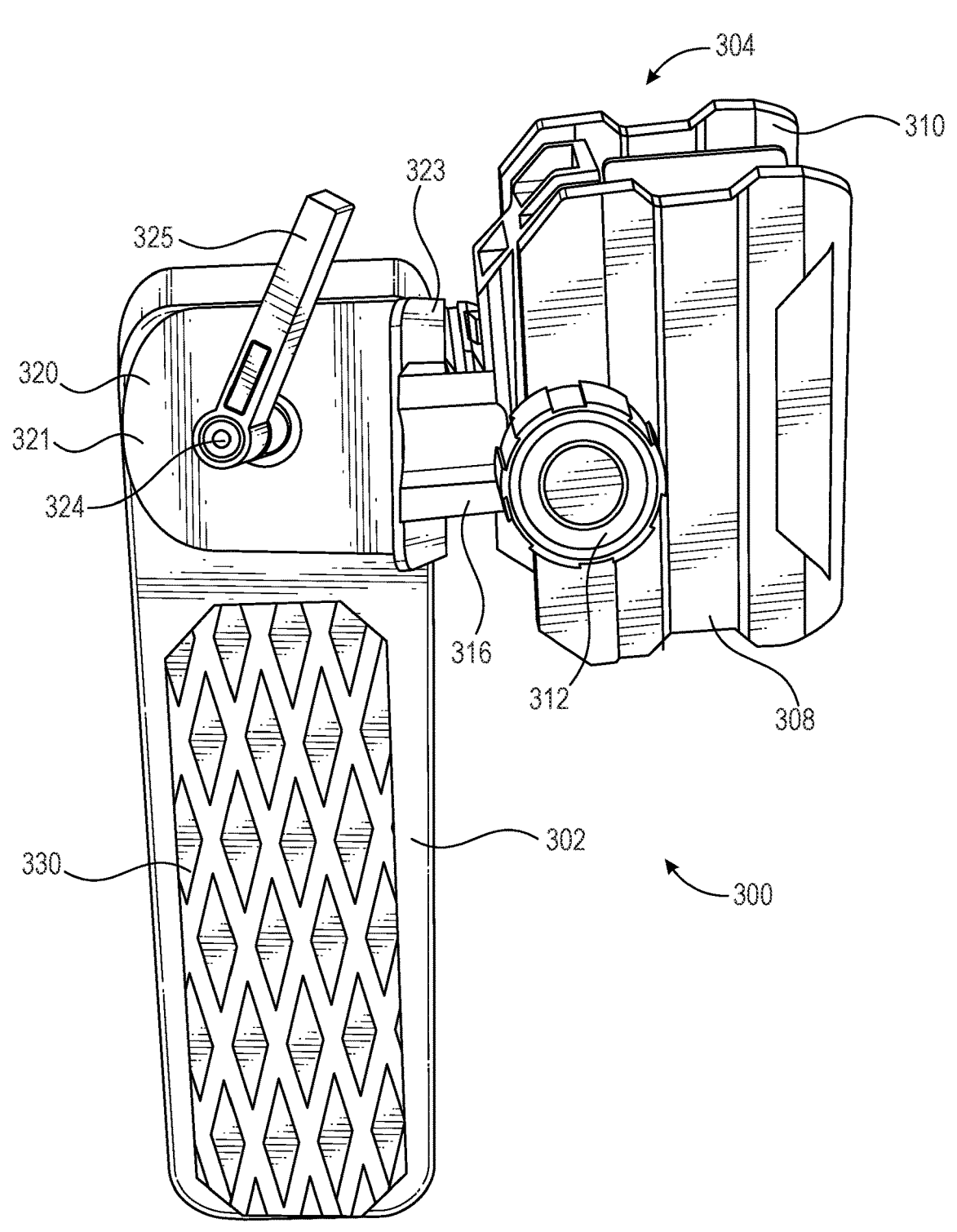
FIG. 15 illustrates a right side elevation view of a firearm holder with the holder rotated forward.
Figure 16:
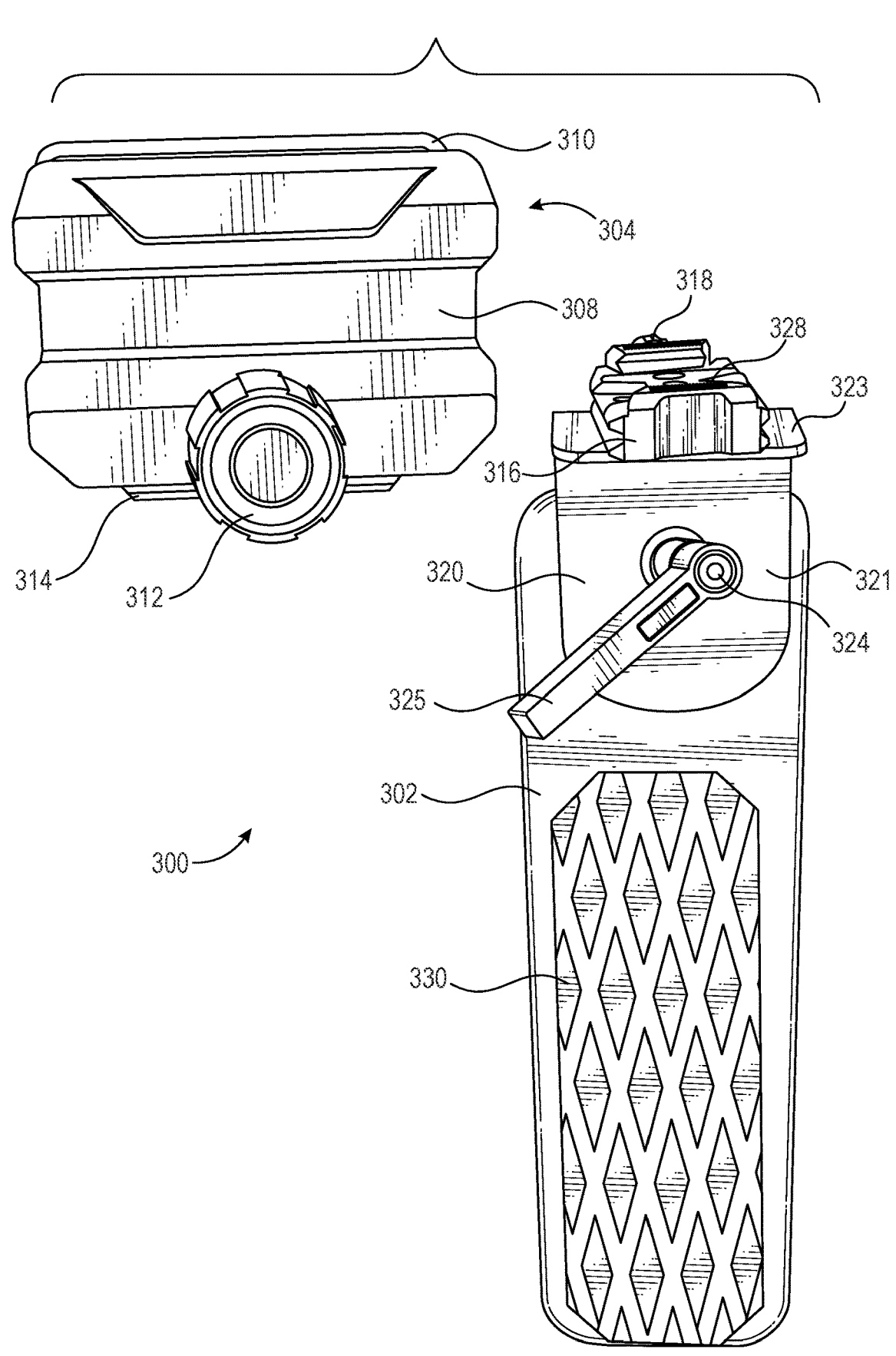
FIG. 16 illustrates a right side elevation view of a firearm holder with the holder decoupled from the leg.
Figure 17:
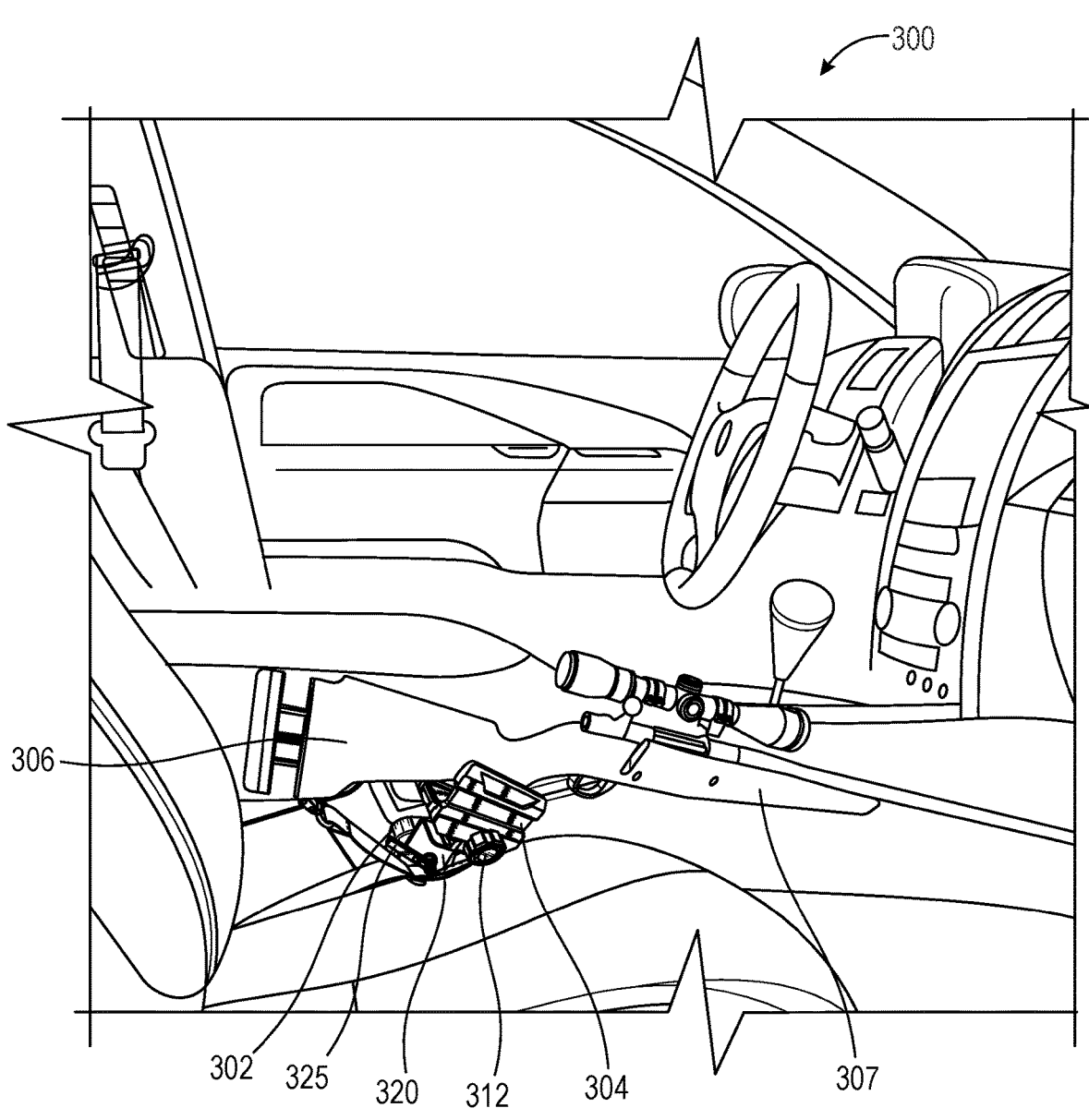
FIG. 17 illustrates a right, top perspective view of a firearm holder positioned between a seat and a console, securing a firearm.
Figure 18:
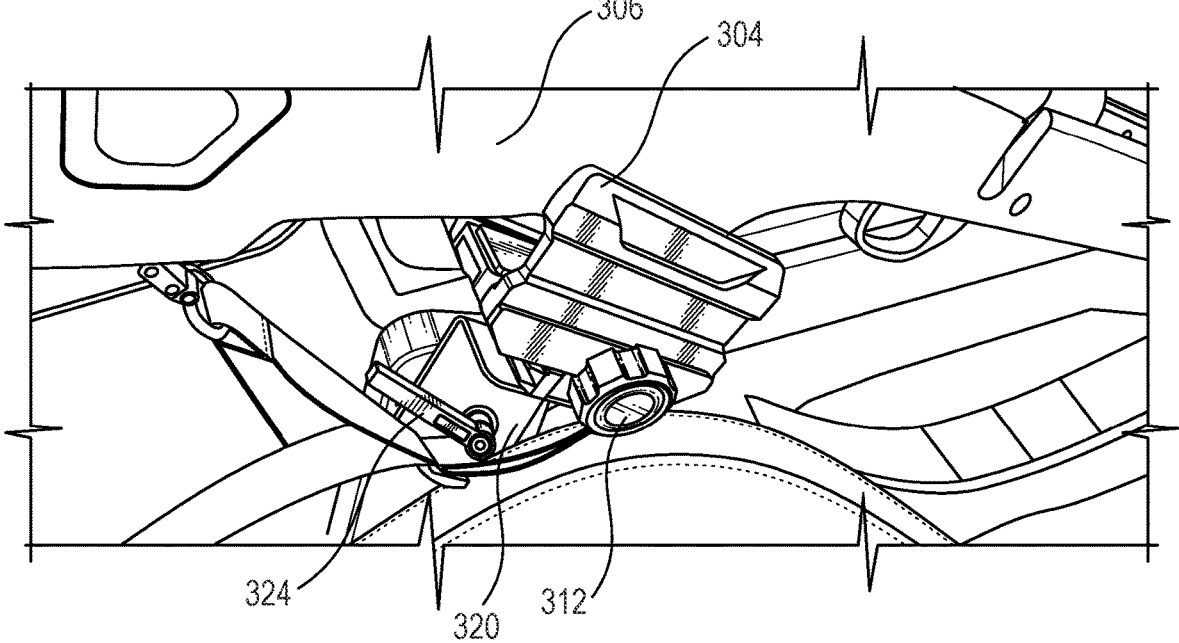
FIG. 18 illustrates a detailed, right, top perspective view of a firearm holder positioned between a seat and a console, securing a firearm.

FIGS. 11-18 illustrate a firearm holder 300, according to some embodiments. Referring to FIGS. 11-12, the firearm holder comprises a leg 302 and a support member 304, the leg 302 interposable between two vehicle seats or a vehicle seat and a center console (as best seen in FIGS. 17-18). The support member 304 may be U-shaped and configured in size and orientation as to receive the stock 306 of a firearm 307 (FIGS. 17-18) (e.g., rifle, shotgun, etc.). The support member 304 comprises a first arm 308 opposite a second arm 310, the distance between the first arm 308 and the second arm 310 being adjustable to fit various widths of firearms or other devices. For example, an adjustment knob 312 may actuate a threaded rod that couples the first arm 308 to the second arm 310, thereby extending the distance between the two arms 308, 310 when the knob 312 is actuated in a first direction and narrowed when actuated in a second, opposite direction. The first and second arms 308, 310 may be separated by, and coupled to, a base 314. For example, a threaded rod may extend from the knob 312, through the first arm 308, through the base 314, and through the second arm 310. The base 314 and the arms 308, 310 may each feature a pad 315 which contacts the stock 306 of the firearm 307. Each pad 315 may feature soft, protective foams, gels, rubbers, and related materials to prevent scratches to the firearm while at the same time also firmly holding the stock 306 stationary when the vehicle is in motion.

While described as having an adjustment knob 312 to adjust the width between the arms 308, 310, it will be appreciated that any known clamping or sliding mechanisms may be used to effectuate the movement of the arms relative to one another, such as threaded bolts, rods and springs, cam levers, hand knobs, etc. In some embodiments, spring-loaded protrusions or bushings may be used inside the support member 304 to dynamically adjust the width between the arms 308, 310 to thereby firmly cradle and hold the stock 306 of most firearms, regardless of width.

The base 314 may be slidably adjustable in relation to the leg 302. For example, the base 302 may couple to a bracket 316, the bracket 316 being coupled to the leg 302. A user may actuate a second adjustment knob 318 that loosens or tightens a locking screw that engages the bracket 316. In other words, the second adjustment knob 318 actuates a locking screw that passes through the base 316 and abuts the side of the bracket 316. When the second knob 318 is actuated in a first direction, the locking screw extends into the bracket 316, thereby prohibiting movement of the base 314 on the bracket 316. When actuated in a second direction, thereby withdrawing the screw, the base 314 is able to slide along the bracket 316 and, in some embodiments, be removed therefrom, as best seen in FIG. 16.

In some embodiments, the firearm holder 300 comprises a swivel bracket 320 couplable between the support member 304 and the leg 302, thereby allowing the angle of the support member 304 to vary in relation to the leg 302. For example, the swivel bracket 320 may couple to a first side 322 of the leg 302, such as via a locking mechanism 324 (e.g., cam lock, screw lock, clamp, etc.), with the bracket 316 coupled to the swivel bracket 320 (such as via bolt 326). When a user desires to adjust the angle of the support member 304 in relation to the leg 302, a user may loosen the locking mechanism 324 (such as by actuating the cam handle 325), which functions as a swivel point, allowing the swivel bracket 320 to swivel or rotate around the locking mechanism 324. Once the desired angle is achieved, a user may then actuate the locking mechanisms 324 to secure the swivel bracket 320 in position.

The swivel bracket 320 may rotate a complete 360-degrees, although it may rotate less without departing herefrom. For example, as shown in FIG. 15, the swivel bracket 320 has been rotated forwarded about 90 degrees (i.e., the longitudinal axis of the holder 304 is parallel to the longitudinal axis of the leg 302). Additionally, the swivel bracket 320 may comprise a first portion 321 configured to abut the leg 302 and swivel thereon, and a second portion 323 substantially perpendicular to the first portion 321 and to the leg 302.

In this manner, the user may incrementally rotate the swivel bracket 320 such that the support member 304 will be in alignment with the stock 306 of a resting firearm 307 when the leg 302 is placed in a vehicle (e.g., FIGS. 17-18). For example, the height of the seat in relation to the floor may determine the angle for the support member 304. The higher the seat, the steeper the angle needed for support member 304.

As shown in FIG. 16, the support member 304 may be removed from the bracket 316. This may be effectuated using tongue and grooves, rails and channels, or any other mechanism known in the art. For example, the base 314 may comprise channels or grooves for receiving the rails 328 of the bracket 314. Once received, the second adjustment knob 318 (actuating a locking screw or similar) secures the base 314 to the bracket 316. Accordingly, a user may easily remove the support member 304 for cleaning, replacement, storage, etc. or to replace the support member 304 for varying sizes.

Additionally, the leg 302 may further comprise a non-slip pad or other textured surface 330 that may function as a non-slip surface (e.g., foam, rubber, etc.), thereby ensuring that the leg 302 remains secured between the seats or seat and console as positioned by a user. The textured surface 330 may also comprise soft materials to aid in preventing damage to the vehicle when inserted between seats or a seat and a console. It will be appreciated that features disclosed in other embodiments may be combined with features of embodiment 300, including, but not limited to, magnets, straps, protrusions, barrel holders, etc.

As a result, the firearm holder 100, 200, 300 disclosed herein solves the need for a firearm holder that does not require modification to the vehicle, allows the user to adjust their seat, enables quick access to the firearm 107, and accommodates a wide spectrum of makes and models across rifles and shotguns.

It will also be appreciated that systems and methods according to certain embodiments of the present disclosure may include, incorporate, or otherwise comprise properties or features (e.g., components, members, elements, parts, and/or portions) described in other embodiments. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment unless so stated. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A firearm holder, comprising:
only a single leg configured to be frictionally wedged between two seats or a seat and a console within a vehicle;
a swivel bracket coupled to a first side of the leg via a locking mechanism configured to releasably fix an angular position of the swivel bracket relative to the leg, the swivel bracket comprising a first portion abutting the leg and a second portion extending substantially perpendicular to the first portion, the swivel bracket being selectively positionable in relation to the leg, wherein in a first position, the second portion extends laterally outward from a top of the leg, and in a second position, the second portion extends laterally outward from a side of the leg;
a bracket coupled to the second portion of the swivel bracket; and
a support member comprising:
a base configured to couple to the bracket,
a first arm on a first side of the base,
a second arm on a second side of the base, and
a first adjustment knob configured to adjust the distance between the first and second arm.

2. The firearm holder of claim 1, wherein the leg further comprises a non-slip surface.

3. The firearm holder of claim 1, wherein the locking mechanism comprises a cam handle.

4. The firearm holder of claim 1, wherein the support member is removable from the bracket coupled to the swivel bracket.

5. The firearm holder of claim 1, wherein the leg comprises a magnet couplable to metal components on the console or the seats of the vehicle.

6. The firearm holder of claim 1, further comprising a floor barrel bracket comprising a barrel sleeve.

7. A method of using the firearm holder of claim 1 to hold a firearm, the method comprising:
forcing the leg of the firearm holder between two seats or a seat and a console of a vehicle until the leg reaches the floor or until a desired position is reached;
adjusting an angle of the support member via the swivel bracket to achieve a desired angle;
placing a stock of the firearm between the first arm and the second arm of the support member; and
adjusting the width between the first and second arms via an adjustment knob.

8. The method of claim 7, further comprising securing a strap over the stock, the strap coupled to the first arm and second arm of the bracket.

9. The method of claim 7, further comprising coupling one or more protrusions to the stock of the firearm and inserting the one or more protrusions into one or more corresponding channels in the support member.

* * * * *